July 4, 1961 G. H. BRODIE ET AL 2,991,428
ELECTRONIC GENERATOR OF TELEPHONE RINGING CURRENT
Original Filed Aug. 18, 1952
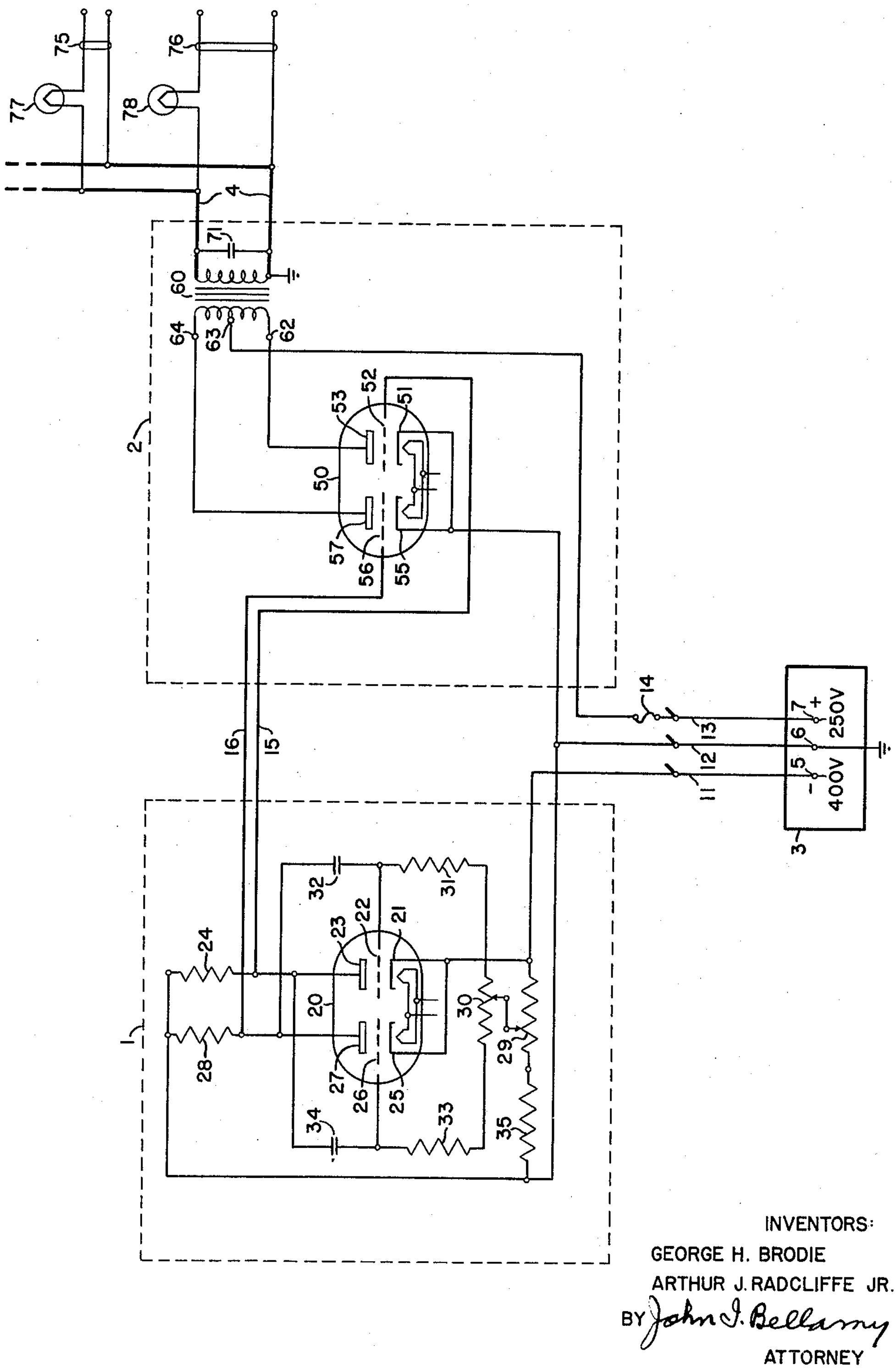
INVENTORS:
GEORGE H. BRODIE
ARTHUR J. RADCLIFFE JR.
BY John J. Bellamy
ATTORNEY United States Patent Office 2,991,428

Patented July 4, 1961

2,991,428

ELECTRONIC GENERATOR OF TELEPHONE RINGING CURRENT

George H. Brodie and Arthur J. Radcliffe, Jr., La Grange, Ill., assignors to International Telephone and Telegraph Corporation, a corporation of Maryland Continuation of application Ser. No. 305,048, Aug. 18, 1952. This application Mar. 12, 1958, Ser. No. 721,022

5 Claims. (Cl. 331—75)

This invention relates to an electronic generator of telephone ringing current. The main object is to provide a simple, reliable, and efficient electronic generator suitable for supplying ringing current for use in a telephone system to operate the ringers at called telephones.

A further object is to provide a device which is readily adjustable to the precise desired frequency and to provide a balanced wave form, and which is sufficiently stable in frequency and waveform that it serves satisfactorily in frequency-selective party-line telephone systems.

In its preferred form, the invention includes a twin-triode push-pull power amplifier which is transformer-coupled to the ringing current output wires and which is driven by a suitable square-wave voltage generator, or vibrator. In the preferred form of the invention, the driving voltage generator takes the form of a dual-triode electronic multivibrator.

A feature of the invention resides in the use of oppositely poled sources of power for the multivibrator voltage generator and the power amplifier. This provision permits the two parts to be directly coupled as in a direct-current amplifier, thereby lessening the load requirements on the multivibrator and consequently enhancing its stability of operation, as well as permitting the desired low-frequency voltage to be faithfully impressed on the grids of the power amplifier.

This application is a continuation of our application Serial Number 305,048, filed August 18, 1952, now abandoned.

A feature of the disclosed simple driving arrangement is that the grid of either triode of the power amplifier is driven alternately to a negative cutoff potential and to cathode potential, rather than to one more positive than the cathode, whereby a relatively high power-output efficiency is realized without drawing grid current, thereby further lessening the power demand on the driving multivibrator.

Other objects and features will become apparent as the description progresses.

Referring to the accompanying drawing, the invention is illustrated as applied to an electronic generator comprising a multivibrator voltage generator 1 and a push-pull amplifier 2, supplied with opposite polarities of direct-current by power unit 3.

Voltage generator 1, by its controlled multivibrator action hereinafter described, provides the amplifier 2 with voltage of the desired frequency and basic waveform, thus functioning as a driver for the amplifier 2, to which its output is directly coupled over wires 15, 16.

Power amplifier 2 has its output transformer-coupled to a pair of bus bars 4, from which the output ringing current is supplied through the respective sections of a telephone switchboard (not shown) over corresponding branch pairs of conductors such as 75 and 76 by way of respective current-limiting lamps (generator lamps) such as 77 and 78. By way of example, telephone ringing current is commonly of a frequency in the range extending from about 16 to 66 cycles per second.

The power unit 3 contains two oppositely poled sources of power having a common intermediate terminal 6, which is illustrated as being grounded. Terminal 5 is negative with respect to common terminal 6, whereas terminal 7 is positive with respect to the grounded common terminal. Ground at the common terminal 6 is extended to items 1 and 2 by common conductor 12; conductor 11 extends from terminal 5 to supply a negative 400-volt potential to the voltage generator 1; and conductor 13 extends from terminal 7, by way of fuse 14, to supply a positive 250-volt potential to power amplifier 3.

The voltage generator 1 comprises one form of the well-known free-running multivibrator. It develops voltage of the desired frequency and magnitude, and of a balanced square waveform to drive the power amplifier 2 over wires 15 and 16. Generator 1 includes the twin triode tube 20, of which the two sections provide alternative paths for current conduction from negative power-supply conductor 11, through load resistors 24 and 28 to ground.

OPERATION OF VOLTAGE GENERATOR 1

As previously indicated, the voltage generator 1 comprises a free-running multivibrator. Such a multivibrator comprises essentially two mutually coupled triode amplifiers. In the usual form, herein illustrated, the output of each triode amplifier is capacity coupled (condensers 32, 34) to the input of the other, wherefore a signal causing conduction in one depresses conduction in the other by virtue of the out-of-phase voltage relationship between the grid and anode of a triode amplifier.

The two triodes of voltage generator 1 comprise the two sections of dual-triode tube 20. The left section includes cathode 25, control grid 26, and anode 27, parts 21, 22, and 23 being the respectively corresponding parts of the right section.

The voltage generator 1 starts operating whenever the parts thereof are assembled, and interconnected, and supplied with power as illustrated, provided that the cathodes 25 and 26 are in heated condition, by virtue of current flow through their illustrated heaters from a suitable source of heater current (not shown). For simplicity of explanation, however, it may be assumed that power-supply wire 11 is disconnected from the heated cathodes 21 and 25, but is connected as illustrated to the right-hand terminal of potentiometer 29. Current is flowing from wire 11 to ground through items 29 and 35, rendering the potential on the slide arm of item 29 somewhat less negative (more positive) than wire 11 to a degree depending on its setting. This relatively positive potential on the slide arm of item 29 passes through the slide arm of potentiometer 30, and through the end sections thereof and through grid resistors 33 and 31, to grids 26 and 22, respectively. These grids are thus normally more positive than negative supply wire 11.

If wire 11 now be connected as shown to the cathodes 25 and 21 of tube 20, grid current immediately starts to flow from these cathodes to their respective grids. The high resistance of grid resistors 33 and 31 and of the respective halves of the balancing item 30 keep this flow small, resulting in the grids 26 and 22 being drawn down to a potential substantially no more positive than the cathodes 25 and 21, thus placing the grids at a definite working point at the positive end of the grid-voltage control range. This is the point at which cathode-anode current flows most readily.

With both grids at the positive end of the range, current immediately starts to build up in both sections of tube 20. This rise of current builds up a negative potential (with respect to wire 12) on anodes 23 and 27 by virtue of the drop across the associated resistors 24 and 28. This rising negative potential on the plate of either triode section 13 is passed by condensers 34 and 32 to control grids 26 and 22. The resulting negative potential on either control grid acts to inhibit conduction through the associated section of tube 20 to an extent depending on the value of the negative grid potential. Invariably the two inhibiting actions fall short of exact equality, with the result that the initial current rise is faster in one section than in the other. The section through which the faster current rise occurs draws full current almost instantly, wherefore its anode reaches its full negative potential almost instantly, and therefore almost instantly stops conduction through the other triode section by driving the grid of such other section negative beyond the cutoff point.

By way of example, if the left-hand triode section is the initially conducting one, the voltage drop thereby produced across load resistor 28 causes the anode 27 to become highly negative with respect to conductor 12. The control grid 22, by the action of the coupling condenser 32, simultaneously becomes substantially equally negative with respect to its described normal potential supplied through grid resistor 31. The resistors 28 and 24 are so chosen that the voltage drop across either, when the associated section of tube 20 is fully conducting, is sufficient to act through the concerned condenser 34 or 32 to swing the grid of the other section of the tube negative beyond cutoff. Therefore, the right-hand section of tube 20 is rendered completely non-conducting by the sudden rise of current to full value through the left-hand section and by the described resulting negative swing of grid 22.

Full current continues to flow through the left-hand section of tube 20 until the right-hand section starts to conduct, as it soon does by virtue of the return of the potential of grid 22 toward normal potential by the flow of leakage current through grid resistor 31.

At the end of a short time interval, the length of which depends, among other things, upon the capacity of condenser 32 and the resistance of grid-leak resistor 31 and associated section of item 30, the excess negative potential induced on grid 22 through condenser 32 has sufficiently leaked off through resistor 31 that the right-hand section (cathode 21 and anode 23) start to conduct. The consequent initially small negative drop across resistor 24 acts through condenser 34 to render grid 26 more negative than its described normal biased potential. Thereupon, the flow of current through the left-hand section responsively decreases a corresponding amount. This initially small decrease in flow correspondingly decreases the negative drop across resistor 28, which acts through condenser 32 to render grid 22 immediately less negative, thereby reinforcing the initially small flow of current through the right-hand section. The flow of current in the right-hand section is thus self-reinforcing by virtue of the described decreasing action on the flow in the left-hand section and the consequent positive flow-assisting potential which is reflected back to grid 22 by condenser 32. As a result, when the current initially starts to flow in the right-hand section of tube 20 by virtue of the leaking-off of the high negative potential from grid 22, the current flow through such section rises abruptly to full value, accompanied by the abrupt decrease of current to zero in the left-hand section. This sudden cessation of current in the left-hand section of tube 20 results from the sudden negative voltage drop across resistor 24, reaching grid 26 through condenser 34. Grid 26 is thereby driven negative beyond the cut-off point, as described hereinbefore for grid 22. The relatively positive potential placed at this time on grid 22 through condenser 32 (by cessation of current flow through resistor 28) is limited in value to cathode potential by the grid current that flows when grid 22 tends to become positive. Either grid of tube 20 thus returns to its reference point at the positive end of the grid voltage range at the commencement of a period of current flow through its section of tube 20. The left-hand section again starts to conduct, when enough of the negative potential (with respect to cathode) has leaked off grid 26. At this point the described reflecting action occurs to switch that section into full conduction, at the same time abruptly terminating flow in the opposed section.

The described "flip-flop" alternate conducting action of the two triode sections of tube 20 continues indefinitely, with either springing abruptly into full conductivity coincidentally with an abrupt cessation of flow in the other section.

When the device 1 is operating satisfactorily, the alternately conducting sections of tube 20 conduct for equal lengths of time, and conversely, remain non-conducting for equal lengths of time. Any observed inequalities in this respect may be remedied by adjusting the slide arm of balance potentiometer 30, which has the effect of adding resistance to the leak path of one grid (26 or 22) and removing it from the leak path of the other.

When device 1 is operating satisfactorily, the frequency of operation (the number of times a second either tube conducts) is the ringing-current frequency chosen for bus bars 4. Any observed departure from that frequency may be remedied by moving the slide arm of potentiometer 29 to the left to increase frequency and to the right to decrease frequency. For example, moving the arm of part 29 to the left renders it more positive, to thereby hasten the leaking off (through resistor 33 or 31) the excess negative potential of the currently blocked grid.

For five selected frequencies in the ringing-current frequency range from 16 to 66 cycles, the components of voltage generator 1, with the indicated 400-volt supply over wires 11 and 12, may be as follows:

Tube 20 may be a commercial twin triode of the type sold as 6SN7; resistor 35 may be 240,000 ohms; potentiometers 29 and 30 may be 50,000 and 500,000 ohms, respectively; and resistors 24 and 28 may each be 50,000 ohms. For the indicated frequencies, the condensers 32 and 34, and the resistors 31 and 33, may have values as listed in the following table:

*Frequency table*

| Cycles | 32 and 34, mf. | 31 and 33, megohms |
|---|---|---|
| 16 | .0060 | 9.00 |
| 30 | .0055 | 5.00 |
| 42 | .0045 | 4.00 |
| 54 | .0050 | 3.00 |
| 66 | .0050 | 2.25 |

OPERATION OF POWER AMPLIFIER 2

Power amplifier 2 responds to voltage and frequency control received from voltage generator 1 over wires 15 and 16 to impress alternating ringing current of substantial power and of the desired ringing frequency on bus bars 4, by way of coupling transformer 60. The cathodes 55 and 51 of the power-amplifier tube 50 are connected to conductor 12, which is the positive anode-supply wire for the multivibrator tube 20. Through wires 12, 15, and 16, the load resistors 24 and 28 of tube 20 are thus connected in the position of grid resistors for the respective sections of tube 50: resistor 24 connects grid 52 to its cathode 51; and resistor 28 connects grid 56 to its cathode 55. Therefore, when either resistor 24 or 28 is currentless, the corresponding grid 52 or 56 is at the potential of its cathode 51 or 55, and the associated triode section of tube 50 conducts. But, when a resistor 24 or 28 is carrying current incidental to the described multivibrator action of device 1, the associated grid of tube 50 is thereby rendered highly negative with respect to its cathode, whereupon current flow through the concerned triode section of tube 50 is entirely blocked.

Since, as described, the two sections of tube 20 conduct alternately, the grids 52 and 56 are rendered negative alternately, and the two normally conducting sections of power-amplifier tube 50 are thereby rendered non-conducting alternately.

When the left-hand section is non-conducting, as it is when wire 16 and grid 56 are rendered negative with respect to wire 12 by current flow through load resistor 28, the right-hand section of tube 50 is conducting because current is not then flowing through load resistor 24, and the potential of the cathodes 55 and 51 reaches grid 52 through wire 12, resistor 24, and wire 15. The conduction path through tube 50 is now from the intermediate terminal 6 of power supply 3, over conductor 12, cathode 51, anode 53, terminal 62, the lower half of the primary winding of transformer 60, terminal 63, fuse 14, and over conductor 13 to the positive 250-volt terminal of power source 3. The core structure of transformer 60 is thereby magnetized in a given direction.

A moment later, the right-hand section of tube 50 becomes non-conducting, and its left-hand section becomes conducting, by virtue of current flow ceasing in load resistor 28 and starting in resistor 24. Current flow thus ceases in the transformer section lying between terminals 62 and 63, and starts in the section lying between terminals 64 and 63, over the following path: from the intermediate terminal 6, conductor 12, cathode 55, anode 57, terminal 64, associated winding, terminal 63, and thence through fuse 14 and conductor 13 to the positive 250-volt terminal 7. The core structure of transformer 60 is thereby magnetized in the opposite direction.

The secondary winding of the transformer 60 responds to the noted magnetization of its core in opposite directions by impressing an alternating-current potential across bus bars 4, thus serving as a source for supplying telephone ringing current over the branch circuits such as 75 and 76. This ringing current is of balanced wave form and of the frequency generated by device 1. The condenser 71 shunting the secondary winding renders the voltage waveform across bus bars 4 more nearly sinusoidal.

With no load applied to the power amplifier 2 by the bus bars 4, the two halves of the primary winding of transformer 60 appear highly inductive to the anode current in each half of the primary, and as a result of this inductance, limit the anode current to a low and safe value. As the load applied to the bus bars 4 becomes greater, the effective inductance of the primary becomes less, whereby the current-limiting action is decreased, allowing a greater anode current to flow. When the applied load on bus bars 4 becomes great enough to cause damage to the power amplifier 2, fuse 14 opens, rendering the power amplifier 2 inoperative and causing an alarm system (not shown) to operate.

For any of the selected frequencies in the ringing-current frequency range from 16 to 66 cycles, the components of power amplifier 2, with the indicated 250-volt supply, over conductors 12 and 13, may be as follows: tube 50 may be a commercial twin-triode such as the 6AS7; fuse 14 may be ¼ ampere; condenser 71 may be .040 mf.; and transformer 60 may have a primary consisting of two balanced sections of 1710 turns each and may have a secondary of 1260 turns.

The voltage generator 1 and the power amplifier 2 hereinbefore described may be one of a plurality of such combinations as required in a telephone system employing selective frequency ringing. The power pack 3 may serve as a source of power for a plurality of the described devices as required. As indicated in the drawing, conductors 11, 12, and 13 may be in multiple, to supply the respective potentials to as many hereinbefore described devices as desired.

Referring again to the multivibrator voltage generator 1, it will be observed that the described operation thereof results in the negative wire 11 of the power unit 3 being connected alternately to the two wires 15 and 16 which lead to the grids of power-amplifier 50, and that the resistors 24 and 28 keep these grids normally supplied (over wire 12) with the potential of the cathodes of tube 50, with the result that either grid of the power tube is at zero potential with respect to its cathode except when supplied directly with a high negative potential through the associated section of the tube 20, at which time the associated resistor 24 or 28 draws current. It is evident that the tube 20 could be replaced by a suitable tuned mechanical switching vibrator adapted to connect wire 11 to wires 15 and 16 alternately, but the multivibrator tube arrangement is presented as being more economical and more stable in operation. A mechanical switching vibrator, however, lacks the undirectional limitation of the tube 20, wherefore the wires 12 and 11 incoming to device 1 could be reversed if tube 20 were replaced by a mechanical vibrator. Then the grids of tube 50 would be maintained normally negative by wire 11, through resistors 24 and 28, and would be connected alternately to cathode potential.

We claim:

1. An alternating-current generator comprising a push-pull power amplifier including two sections each having a control grid and having a cathode and an anode for carrying power current subject to the associated control grid being at a potential with respect to its cathode which is less negative than a certain cutoff potential, a control source of direct current of a potential in excess of said cutoff potential having its positive pole connected to said cathodes, means for applying potentials from the poles of the current source to respective ones of said grids in a given and in a reversed pole to grid correspondence alternately at a desired alternating-current frequency, whereby the grids are operated in phase opposition between cathode potential and a potential more negative than said cutoff potential to cause the two sections of the amplifier to conduct alternately, means for causing the applying means to perform its said operations continuously at a substantially constant predetermined frequency, and means for causing the applying means to effect abruptly each of said change of pole to grid correspondence, to thereby apply substantially a square-wave form of voltage change to each grid, each amplifier section being thereby caused to undergo a substantially square-wave form of change between substantially zero conductivity and maximum conductivity.

2. An alternating current generator according to claim 1, further comprising grid resistors continuously connecting the said grids respectively to one pole of the said current source, the said applying means comprising means for connecting the other pole of the said current source to the grids alternately at the said substantially constant predetermined frequency.

3. An alternating-current generator according to claim 2, in which the pole to which the said resistors continuously connect the said grids is the said positive pole of said current source, and in which the said other pole which is connected to the grids alternately is the negative pole of the said current source.

4. An alternating-current generator according to claim 3, in which said means for connecting the said negative pole to the said grids alternately comprises a pair of control triode sections connected respectively between the said grids and said negative pole, together with means for controlling the respective control elements of the control triode sections to cause the last said sections to conduct alternately only, the last said means including means for impressing a substantially square-wave form of controlling change separately upon each of the last said control elements to effect substantially instantaneously each change of condition of the last said sections from that of conducting to that of non-conducting, and conversely.

5. An alternating-current generator comprising a push-pull power amplifier including two sections each having a control grid and having a cathode and an anode for carrying power current subject to the control grid being at a potential with respect to its cathode which is less negative than a certain cutoff potential, a multivibrator including two triode sections each comprising a control grid, a cathode, and an anode, two linking conductors directly connecting the anodes of the multivibrator triodes to the grids of the respective power-amplifier sections, two load-impedance devices for the multivibrator sections each having one terminal connected to a separate anode thereof, a return conductor connecting the other terminal of each load-impedance device in common to the cathodes of the power-amplifier sections, a power-supply conductor for the multivibrator sections extending in common to the cathodes thereof, a source of direct-current potential in excess of said cutoff potential having its positive pole connected to said return conductor and having its negative pole connected to said power-supply conductor, bias-conducting means for normally maintaining the control grid of each multivibrator section at a potential with respect to its cathode which will render conducting the space between the associated cathode and anode, two condensers each connecting a separate anode of the multivibrator sections to the control grid of the other multivibrator section, said condensers being of such capacity that the multivibrator sections are rendered non-conducting alternately at a selected frequency, whereby the resulting potential drop occurring alternately across said impedance devices causes the potential of the power-amplifier control grids with respect to their associated cathodes to vary in phase opposition between a potential which is more negative, and a potential which is less negative, than said cutoff potential.

References Cited in the file of this patent

UNITED STATES PATENTS

| | | |
|---|---|---|
| 2,154,492 | Clough | Apr. 18, 1939 |
| 2,297,926 | Usselman | Oct. 6, 1942 |
| 2,529,459 | Pourciau et al. | Nov. 7, 1950 |
| 2,552,968 | Hochwald | May 15, 1951 |
| 2,579,374 | Edwards | Dec. 18, 1951 |
| 2,629,006 | Oliver | Feb. 17, 1953 |
| 2,639,379 | Blancher | May 19, 1953 |